(12) United States Patent
Slycke et al.

(10) Patent No.: US 8,839,679 B2
(45) Date of Patent: Sep. 23, 2014

(54) METHOD OF DETERMINING MATERIAL DEPENDENT CONSTANTS OF A METAL OBJECT ON FATIGUE TESTING

(75) Inventors: Jan Ture Slycke, Bilthoven (NL); Eusthatios Ioannides, London (GB)

(73) Assignee: Aktiebolaget SKF, Gothenburg (SE)

( * ) Notice: Subject to any disclaimer, the term of this patent is extended or adjusted under 35 U.S.C. 154(b) by 1278 days.

(21) Appl. No.: 12/308,501

(22) PCT Filed: Jun. 27, 2007

(86) PCT No.: PCT/EP2007/005682
§ 371 (c)(1),
(2), (4) Date: Jul. 1, 2011

(87) PCT Pub. No.: WO2008/000458
PCT Pub. Date: Jan. 3, 2008

(65) Prior Publication Data
US 2011/0259116 A1    Oct. 27, 2011

(30) Foreign Application Priority Data
Jun. 28, 2006    (WO) ................. PCT/EP2006/006248

(51) Int. Cl.
*G01N 3/32*    (2006.01)
*G06Q 10/04*    (2012.01)
*G01M 13/04*    (2006.01)

(52) U.S. Cl.
CPC ............... *G06Q 10/04* (2013.01); *G01M 13/04* (2013.01)
USPC ........................................................ 73/808

(58) Field of Classification Search
USPC .............................. 73/83, 808, 81, 82, 85, 87
See application file for complete search history.

(56) References Cited

U.S. PATENT DOCUMENTS

| | | | | |
|---|---|---|---|---|
| 3,661,655 A | * | 5/1972 | Hrusovsky | .................... 148/578 |
| 4,597,283 A | * | 7/1986 | Deroche et al. | ................. 72/378 |
| 4,614,552 A | * | 9/1986 | Fortin et al. | .................... 148/417 |
| 4,852,397 A | * | 8/1989 | Haggag | ............................. 73/82 |
| 5,062,293 A | * | 11/1991 | Bakirov et al. | .................... 73/81 |
| 5,463,896 A | * | 11/1995 | Abbate et al. | ..................... 73/81 |
| 6,718,820 B2 | * | 4/2004 | Kwon et al. | ..................... 73/81 |

(Continued)

FOREIGN PATENT DOCUMENTS

EP    1184813 A    3/2002

OTHER PUBLICATIONS

Z. Guo, A.F. Sprecher, and H. Conrad, "Correlation of the Monotonic and Low-Cycle Fatigue Properties of SolderJoints with Phase Diagrams", Journal of Phase Equilibria vol. 13 No. 3 1992, pp. 227-234.*

(Continued)

*Primary Examiner* — Andre Allen
*Assistant Examiner* — Nasir U Ahmed
(74) *Attorney, Agent, or Firm* — Bryan Peckjian; SKF USA Inc. Patent Department (57) ABSTRACT

A method of determining material constants of a hardened metal object being exerted to load cycles, and a method of indicating fatigue damage rate of a hardened metal object in relation to load cycles, N, exerted on the hardened metal object, wherein material dependent constants of the hardened metal object are determined according to the method of determining material dependent constants of the hardened metal object. Methods for indicating fatigue and predicting life of a metal object are disclosed.

15 Claims, 4 Drawing Sheets

(56) References Cited

U.S. PATENT DOCUMENTS

| | | |
|---|---|---|
| 6,778,916 B2* | 8/2004 | Lee .................................. 702/42 |
| 6,945,097 B2* | 9/2005 | Jardret et al. ..................... 73/81 |
| 7,424,822 B2* | 9/2008 | Isomoto ............................ 73/81 |
| 2002/0046012 A1* | 4/2002 | Takemura et al. ................ 703/2 |
| 2002/0088515 A1* | 7/2002 | Aust et al. ..................... 148/706 |
| 2004/0112486 A1* | 6/2004 | Aust et al. ..................... 148/706 |
| 2005/0000673 A1* | 1/2005 | Branagan ........................ 164/98 |
| 2005/0100473 A1* | 5/2005 | Ikuno et al. ................... 420/534 |
| 2006/0056754 A1* | 3/2006 | Beer et al. ..................... 384/625 |
| 2007/0044543 A1* | 3/2007 | Umeda et al. ..................... 73/76 |

OTHER PUBLICATIONS

Yanyao Jiang, Huseyin Sehitoglu, "A model for rolling contact failure", Wear 224, 1999, pp. 38-49.*

Spindler, The Prediction of Creep Damage in Type 347 Weld Metal. Part I: The Determination of Material Properties From Creep and Tensile Tests/British Energy, Assessment Technology Group/Barnett Way, Barnwood, Gloucester, GLA 3RS UK/XP004693020.

Aglan, Gan, Fatigue Crack Growth Analysis of a Premium Rail Steel/ Mechanical Engineering Department, Tuskegee University, Tuskegee, AL 36088, USA Journal of Materials Science, Kluwer Academic Publishers.

Yang, Kuang, Shlyannikov, Fatigue Crack Growth for Straight-Fronted Edge Crack in a Round Bar/ Department of Engineering Mechanics, Shanghai Jiaotong University, Shanghai 2002-40, China Kazan State Power Engineering Institute, 51 Krasnoselskaya Street, 420066 Kazan, Russia Federation Elsevier Ltd., International Journal of Fatigue, Butterworth Scientific Ltd., Guildford, GB..

Colombi, Plasticity Induced Fatigue Crack Growth Retardation Model for Steel Elements Reinforced by Composite Patch /Department of Structural Engineering, Technical University of Milan (Politecnico di Milano) Piazza L. da Vinci, 32-20133 Milan, Italy Elsevier Ltd., Theoretical and Applied Fracture Mechanics.

Sasikala, Ray, Mannan, Evolution of Damage in Tertiary Creep of Type 316(N) SS Weld Metal/Materials Development Group, Indira Gandhi Centre for Atomic Research, Kalpakkam 603 102, India Elsevier Ltd., Acta Materialia Inc.

* cited by examiner

METHOD OF DETERMINING MATERIAL DEPENDENT CONSTANTS OF A METAL OBJECT ON FATIGUE TESTING

TECHNICAL FIELD

The invention concerns methods of determining material dependent constants of a hardened metal object being exerted to load cycles, and a method of indicating fatigue damage evolution and damage rate of a metal object, especially a hardened metal object, and in particular a hardened metal bearing component.

BACKGROUND

Fatigue, one of the most common material degradation mechanisms in industry in general and in the bearing industry in particular, occurs when material experiences lengthy periods under repeated or cyclic stresses which can lead to failure at stress levels much lower than the tensile or yield strength. It has long been recognised that nearly 90% of industrial component failure takes place due to fatigue. Hence the importance of evaluation of fatigue damage in metallic components and building a solid understanding of the fatigue phenomenon, aiming at preventing fatigue failures from occurring.

One example in this direction is EP1184813A2. EP1184813A2 describes how a dynamic equivalent load P is calculated from data information of a rolling bearing. Thereafter, a reliability coefficient $a_1$ is determined, a lubrication parameter $a_L$ corresponding to a used lubricant is calculated, and a contamination degree coefficient $a_c$ is determined in consideration of a material coefficient. A fatigue limit load $P_u$ is calculated on the basis of the data information. Thereafter, a load parameter $\{(P-P_u)/C\} \cdot 1/a_o$ is calculated. On the basis of the lubrication parameter and the load parameter $\{(P-P_u)/C\} \cdot 1/a_o$, a life correction coefficient $a_{NSK}$ is calculated with reference to a life correction coefficient calculation map. The bearing life $L_A$ is calculated as $L_A = a_1 \cdot a_{NSK} \cdot (C/P)^P$.

Unfortunately life models commonly approach the fatigue problem in a simplified manner and commonly treat the metal in a highly idealised way. The models therefore exhibit limitations and there seems still to be room for improvements as regards the understanding of the characteristics of metals, especially as a bearing material, the life models, and the influences from the operating environment on the characteristics of bearing material.

SUMMARY

According to one aspect, the present invention relates to a method for indicating material constants of a hardened metal object and in particular a hardened metal bearing component.

According to another aspect, the present invention relates to a method for indicating fatigue damage rate and/or damage of a hardened metal object and in particular a hardened metal bearing component.

According to still another aspect, the present invention relates to a computer program product implementing at least one of the previous aspects.

According to a further aspect, the present invention relates to a computer readable medium containing program instructions according to any of the previous aspects.

The present invention has its basis in a metal physics description of how hardened metal materials behave under high cycle fatigue conditions, including not only the effects of the Hertzian contact stress field, but also the effects of the operating temperature, superimposed (hoop and residual) stresses and speed. The term fatigue includes at least one of rolling contact fatigue (RCF) and structural fatigue, such as rotating bending fatigue, torsion fatigue, uniaxial fatigue, including push-pull fatigue, and multiaxial fatigue. The present invention deals with material dependent constants, plastic damage rate, accumulated fatigue damage, cumulative fatigue, strain damage, and cumulative strain damage.

According to an aspect of the invention a method of determining material constants of a hardened metal object being exerted to load cycles is disclosed. The method comprises a number of steps. In a first step a relative magnitude of subsurface plasticity processes that govern damage evolution of the hardened metal object is determined based on a grooving process of the hardened metal object being exerted to load cycles. In a second step the material dependent constants of the hardened metal object is determined based on the determined relative magnitude of the subsurface plasticity processes.

Suitably the grooving process comprises quantitatively measuring dimensions of a groove, and the measuring comprises measuring a groove depth.

Sometimes the step of determining the relative magnitude of subsurface plasticity processes comprises determining a plastic strain based on shakedown damage and a creep strain based on cyclic fatigue damage. The load cycles exerted on the hardened metal object are preferably done by a rolling contact fatigue test rig. Suitably the load cycles exerted on the hardened metal object are done by a point contact rolling contact fatigue test rig. Preferably the method comprises varying a contact pressure of the exerted load cycles, comprises varying a temperature of the hardened metal object during the exerted load cycles, and/or comprises varying a load cycle frequency.

The different enhancements of the invention as described above can be combined in any desired manner as long as no conflicting enhancements/features/characteristics are combined.

According to an aspect of the invention a method of indicating fatigue damage rate of a hardened metal object in relation to load cycles, N, exerted on the hardened metal object is disclosed. According to the invention material dependent constants of the hardened metal object are determined according any above described method to determine material constants. Suitably the method further comprises calculating the fatigue damage rate based on an effective activation energy parameter for the dislocation climb process, Q, shear stress amplitude, $\tau$, the absolute local temperature of the hardened metal object, T, and load frequency, f. Sometimes it is advantageous that the step of calculating comprises calculating the load cycle based fatigue damage rate according to $d\gamma/dN = A \langle \tau - \tau_u \rangle^c e^{(-kQ/RT)}/f$, where A is $A_0 (H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object, $\langle \tau - \tau_u \rangle$ is zero for $\tau \leq \tau_u$ and $\tau - \tau_u$ for $\tau > \tau_u$, where $\tau_u$ is the fatigue limit for the hardened metal object, c is a constant in the interval 6 to 22, d is a constant in the interval 6 to 22, k is a constant between 0.50 and 1.50, T is the absolute temperature of the hardened metal object at the point of contact, and R is the universal gas constant. Other times it is advantageous that the step of calculating comprises calculating the time based fatigue damage rate according to $d\gamma/dt = A \langle \tau - \tau_u \rangle^c e^{(-kQ/RT)}$ A is $A_0 (H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object, $\langle \tau - \tau_u \rangle$ is zero for $\tau \leq \tau_u$ and $\tau - \tau_u$ for $\tau > \tau_u$, where $\tau_u$ is the fatigue limit for the hardened metal object, c is a constant in the interval 6 to 22, d is a constant in the interval 6 to 22, k is a constant between 0.50 and 1.50, T is the absolute temperature of the hardened metal object at the point of contact, and R is the universal gas constant. Suitably the temperature, T, is below $0.4T_m$, where $T_m$ is the absolute melting temperature of the hardened metal object.

According to a further aspect, a computer program product is disclosed. It is loadable into the internal memory of a computer, comprising software code portions for performing step(s) of any of the previous aspects, when run on a computer.

According to still a further aspect, a computer readable medium containing program instructions for execution on a computer system, which when executed by the computer system, cause the computer system to perform step(s) of any of the previous aspects.

In a non-limiting embodiment the aspects of the present invention may be utilised in remote control, or remote monitoring, of machinery comprising hardened materials by measuring and monitoring the variables discussed above.

The different enhancements of the invention as described above can be combined in any desired manner as long as no conflicting enhancements/features/characteristics are combined.

According to an aspect of the invention a method for indicating fatigue damage rate of a hardened metal object in relation to load cycles, N, exerted on the hardened metal object, wherein the hardened metal object presents a temperature essentially corresponding to the operating conditions of the hardened metal object is disclosed. It comprises calculating the fatigue rate based on an effective activation energy parameter for the dislocation climb process, Q, shear stress amplitude, $\tau$, the absolute local temperature of the hardened metal object, T, and load frequency, f. Further also methods for indicating fatigue and predicting life of a metal object are disclosed According to one aspect of the present invention, a method for indicating fatigue damage rate of a hardened metal object in relation to load cycles, N, exerted on the hardened metal object will now be disclosed. The hardened metal object has a local temperature. Local temperature is here defined as a temperature essentially corresponding to the operating conditions of the hardened metal object. The method comprises calculating the fatigue damage rate on a load cycle base $d\gamma/dN$ or a time base by using an alternative formalism, which will be further elaborated below. The calculating is based on an effective activation energy parameter for the dislocation climb process, Q, shear stress amplitude, $\tau$ (expressed in Pa), the absolute local temperature of the hardened metal object, T, and load frequency or rotational speed, f. In an embodiment the load frequency is constant. In another embodiment, the load frequency varies over time. In an embodiment, the fatigue damage rate is indicated to a user. Each one of the shear stress amplitude and the temperature are constant or variable over time t.

In an embodiment, and in case of the shear stress and/or temperature is constant or non-constant, the fatigue damage rate may be expressed as $d\gamma/dt = A<\tau-\tau_u>^c e^{(-kQ/RT)}$, where A is $A_0(H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object, $<\tau-\tau_u>$ is zero for $\tau \leq \tau_u$ and $\tau-\tau_u$ for $\tau > \tau_u$, where $\tau_u$ is the fatigue limit for the hardened metal object, c is a constant in the interval 6 to 22, d is a constant in the interval 6 to 22, k is a constant between 0.50 and 1.50, T is the absolute temperature of the hardened metal object at the point of contact, and R is the universal gas constant.

However, substituting t=N/f in the expression above (and thus dt=(1/f)dN), an embodiment is reached, in which the step of calculating comprises calculating $d\gamma/dN$ according to $d\gamma/dN = A<\tau-\tau_u>^c e^{(-kQ/RT)}/f$, where A is $A_0(H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object, $<\tau-\tau_u>$ is zero for $\tau \leq \tau_u$ and $\tau-\tau_u$ for $\tau > \tau_u$, where $\tau_u$ is the fatigue limit for the hardened metal object, c is a constant in the interval 6 to 22, d is a constant in the interval 6 to 22, k is a constant between 0.50 and 1.50, T is the absolute temperature of the hardened metal object at the point of contact, and R is the universal gas constant.

In an embodiment, the absolute temperature T expressed in degrees Celsius, t, is in the interval of −55 to 250 degrees Celsius, where t=T-To and To=273.15 degrees Kelvin. In other embodiments the temperature, t, is in the interval of zero to 250 degrees Celsius, in the interval of 15 to 200 degrees Celsius, in the interval of 30 to 150 degrees Celsius, in the interval of 50 to 120 degrees Celsius, in the interval 65 to 110 degrees Celsius, or in the interval 75 to 100 degrees Celsius. In some embodiments, the absolute temperature, T, of the hardened metal object is below $0.4T_m$, where $T_m$ is the absolute melting temperature of the hardened metal object.

In some embodiments, the method further comprises calculating the effective activation energy parameter for the dislocation climb process, Q, according to $Q=Q_0-\Delta V\sigma$, where $\Delta V$ is a material constant, and $\sigma$ is the normal stress field tensor. According to the invention it has also been determined that the fatigue damage process is also influenced by the superimposed (static or dynamic) normal stress field. In other embodiments, $\sigma$ is the hydrostatic stress, which in an embodiment, is calculated according to: $\sigma=(\sigma_{xx}+\sigma_{yy}+\sigma_{zz})/3$, where $\sigma_{xx}$, $\sigma_{yy}$, $\sigma_{zz}$ are the normal stress components.

In another aspect of the invention, integrating the fatigue damage rate relation according to the first aspect over time, or more specifically the variable of number of load cycles, using the actual operating conditions, gives the cumulative fatigue damage, i.e. the integral of the first aspect. A method for indicating cumulative fatigue damage, $\gamma$, of a hardened metal object at a temperature essentially corresponding to the local operating conditions of the hardened metal object and under constant stress amplitude will now be disclosed. It comprises calculating the cumulative fatigue damage, $\gamma$, based on effective activation energy parameter for the dislocation climb process, Q, shear stress amplitude, $\tau$, the absolute local temperature of the hardened metal object, T, load frequency, or rotational speed, f, and number of load cycles, N, exerted on the hardened metal object.

In a case of the shear stress and temperature being constant, the fatigue damage may be expressed as $\gamma = A<\tau-\tau_u>^c e^{(-kQ/RT)}t$. This is the integral of the expression concerning the time based fatigue damage rate discussed above.

However, using also, for a constant load frequency, the substitution t=N/f, an embodiment is reached, in which the step of calculating comprises calculating $\gamma$ according to $\gamma = A<\tau-\tau_u>^c e^{(-kQ/RT)} N/f$, where A is $A_0(H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object, $<\tau-\tau_u>$ is zero for $\tau \leq \tau_u$ and $\tau-\tau_u$ for $\tau > \tau_u$, where $\tau_u$ is the fatigue limit for the hardened metal object, c is a constant in the interval 6 to 22, d is a constant in the interval 6 to 22, k is a constant between 0.50 and 1.50, T is the absolute temperature of the hardened metal object at the point of contact, and R is the universal gas constant.

In some embodiments, the absolute temperature T expressed in degrees Celsius, t, is in the interval of −55 to 250 degrees Celsius, in the interval of zero to 250 degrees Celsius, in the interval of 15 to 200 degrees Celsius, in the interval of 30 to 150 degrees Celsius, in the interval of 50 to 120 degrees Celsius, in the interval 65 to 110 degrees Celsius, or in the interval 75 to 100 degrees Celsius, where t=T−To and To=273.15 degrees Kelvin. In other embodiments, the temperature, T, is below $0.4T_m$, where $T_m$ is the absolute melting temperature of the hardened metal object.

In some embodiments, the method further comprises calculating the effective activation energy parameter for the dislocation climb process, Q, according to $Q=Q_0-\Delta V\sigma$, where $\Delta V$ is a material constant, and $\sigma$ is the normal stress field tensor. This is due to that the fatigue damage process is also influenced by the superimposed (static or dynamic) normal stress field. In some embodiments, $\sigma$ is the hydrostatic stress, and in other embodiments, $\sigma$ is calculated according to $\sigma=(\sigma_{xx}+\sigma_{yy}+\sigma_{zz})/3$, where $\sigma_{xx}$, $\sigma_{yy}$, $\sigma_{zz}$ are the normal stress components.

Now turning to still another aspect and assuming that metal failure occurs when the highest stressed point has accumulated a (non-specified) critical degree of plastic damage, then the formula presented in the second aspect may be used to predict the metal fatigue life. According to this aspect, a method for indicating at least one of an effective activation energy parameter for the dislocation climb process, Q, shear stress amplitude, $\tau$, the absolute local temperature of the hardened metal object, T, load frequency or rotational speed, f, and number of load cycles, N, exerted on the hardened metal object, at a temperature essentially corresponding to the operating conditions of the hardened metal object and under constant stress amplitude is disclosed. In an embodiment, the method may also be used to indicate normal stress field or hydrostatic stress. The method is based on the following relation $N=C\ f/(\langle\tau-\tau_u\rangle^c e^{(-kQ/RT)})$, where $C=C_0(H_V/H_{Vref})^d$, where $C_0$ is a calibration constant representing operating conditions for a reference metal object having a known fatigue life in terms of estimated maximum number of load cycles, $H_{Vref}$ is the Vickers hardness for a reference metal and $H_V$ is the Vickers hardness for the hardened metal object, $\langle\tau-\tau_u\rangle$ is zero for $\tau\le\tau_u$ and $\tau-\tau_u$ for $\tau>\tau_u$, where $\tau_u$ is the fatigue limit for the hardened metal object, c is a constant in the interval 6 to 22, d is a constant in the interval 6 to 22, k is a constant between 0.50 and 1.50, T is the absolute temperature of the hardened metal object at the point of contact, and R is the universal gas constant.

Thus, $C_0$ is a constant that represents the reference operating conditions for the metal object having a known life (for example from endurance testing) and which was used to calibrate the model.

The industrial applicability of the formula above is of course not limited to estimating N, but, for instance when a prediction of N may be known before hand, to solve the equation in view of for instance the local temperature.

In some embodiments, the absolute temperature T expressed in degrees Celsius, t, is in the interval of −55 to 250 degrees Celsius, in the interval of zero to 250 degrees Celsius, in the interval of 15 to 200 degrees Celsius, in the interval of 30 to 150 degrees Celsius, in the interval of 50 to 120 degrees Celsius, in the interval 65 to 110 degrees Celsius, or in the interval 75 to 110 degrees Celsius, where t=T−To and To=273.15 degrees Kelvin. In other embodiments, the temperature, T, is below $0.4T_m$, where $T_m$ is the absolute melting temperature of the hardened metal object.

In some embodiments, the method further comprises calculating the effective activation energy parameter for the dislocation climb process, Q, according to $Q=Q_0-\Delta V\sigma$, where $\Delta V$ is a material constant, and $\sigma$ is the normal stress field. This is due to that the fatigue damage process is also influenced by the superimposed (static or dynamic) normal stress field.

In some embodiments, $\sigma$ is the hydrostatic stress, and in other embodiments, it is calculated according to $\sigma=(\sigma_{xx}+\sigma_{yy}+\sigma_{zz})/3$, where $\sigma_{xx}$, $\sigma_{yy}$, $\sigma_{zz}$ are the normal stress components.

According to a further aspect, a computer program product is disclosed. It is loadable into the internal memory of a computer, comprising software code portions for performing step(s) of any of the previous aspects, when run on a computer.

According to still a further aspect, a computer readable medium containing program instructions for execution on a computer system, which when executed by the computer system, cause the computer system to perform step(s) of any of the previous aspects.

In a non-limiting embodiment the aspects of the present invention may be utilised in remote control, or remote monitoring, of machinery comprising hardened materials by measuring and monitoring the variables discussed above.

The different enhancements of the invention as described above can be combined in any desired manner as long as no conflicting enhancements/features/characteristics are combined:

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 5.

High cycle fatigue response can be seen as being a function of the applied stress amplitude and the number of stress cycles, i.e. a mechanical approach. The fatigue life is then to some extent seen as a probabilistic process that can be treated using statistical methods. Correction factors for any applied mean stress, lubricant film thickness and lubricant contamination are then applied in metal life models for rolling contact fatigue (RCF). The relationship between the applied bearing load (P) and the life (L), expressed in million revolutions, has the form:

$$L=a_{SLF}(C/P)^p \approx \text{Constant}/\langle\tau-\tau_u\rangle^c,$$

where $a_{SLF}$ is the stress life factor, C is the basic dynamic load rating, p is the load ratio exponent, $\tau$ is the subsurface shear stress amplitude, $\tau_u$ is a fatigue limit shear stress and c is the shear stress exponent. Here $\langle\tau-\tau_u\rangle$ is zero for $\tau\le\tau_u$ and $\tau-\tau_u$ for $\tau>\tau_u$. However, it should be noted that this does not treat fatigue damage as being a microstructural effect and therefore only describes the material rather as being a "continuum" having predefined (and non-changing) properties. Still metallographic techniques, including microscopy and X-ray diffraction methods can be used to monitor the accumulation of fatigue damage in mechanical objects, such as bearings. This is an implicit use of a changing microstructure in relation to the fatigue exposure, without detailing how these changes come about.

Some metal life models approach the fatigue problem from a purely mechanical perspective and treats the metal in a highly idealised way. These models therefore exhibit limitations as regards the description of influences from the operating environment on the characteristics of the bearing material.

A fundamental aspect of the invention is the understanding that during fatigue, the microstructure of materials experiences continuous changes until failure.

According to the invention, by introducing a better material description, further improved predictability power of models can be achieved. Such improved models can be used to better dimension metal objects, e.g. bearings, for adverse operating conditions like environmental influences or combined high load and temperature leading to marginal lubrication conditions. By including additional influencing operating parameters like temperature, internal stress state and speed, improved predictability of e.g. life of mechanical objects, is provided.

According to the invention, fatigue damage is seen as a cumulative small-scale plastic deformation process, being controlled by a thermally activated dislocation climb process. The damage induced is a result of a secondary creep-like dislocation process, where iron self-diffusion controlled climb constitutes the rate controlling step, while the major part of the damage induced is a result of dislocation glide, once the dislocations are freed from the obstacles via the climb process (climb+glide). The damage process is therefore driven by the applied shear stress field and is rate controlled via diffusion-controlled climb.

The present invention is based on a metal physics description of the behaviour of hardened (martensite or bainite) steels. Hardened steels can, from a metal physics point of view, be characterised as being non-equilibrium steel (at equilibrium all steels are soft). Such materials, therefore, behave differently than softer steels. Since fatigue is a result of accumulated damage, induced by incremental micro-plastic deformation in each load cycle, the key to improved predictability lies in understanding the micro-plastic behaviour of hard steels.

While plastic deformation in softer steels is controlled by one deformation mechanism, dislocation glide, or micro-yielding, plastic deformation in hard steels, in their non-equilibrium state, may be induced by two different mechanisms, dislocation glide and dislocation climb. The first deformation mechanism is only active above a given threshold stress level (the micro-yield limit), while the latter one is, although strongly stress dependent, active at all stress levels, not excluding the existence of a lower threshold stress level below which the creep mechanism does not occur. The dislocation climb mechanism is governed by diffusion processes and the fatigue response, therefore, also becomes strongly influenced by temperature, time and internal (hoop and residual) stresses and will therefore also be influenced by the running speed.

There are two classes of residual stresses. The ones that are induced during the manufacturing process and that thus are present from the start of the fatigue process (initial residual stresses), and residual stresses that develop (evolve) in the surface and/or subsurface material during the RCF process as a result of different damage processes. The cumulative plastic strain damage is likely to dominate. Examples of contributing mechanisms to the residual stress evolution are:

Shakedown, induced by either classic yielding (dislocation glide) or by a primary creep like deformation process (dislocation climb+glide). This damage occurs during the early part of the fatigue process (typically less than one percent of the fatigue life).

Transformation of retained austenite (when applicable) to martensite or bainite like products (volume increase).

Volume changes of the matrix due to accumulation of crystal defects and due to microstructural changes, followed by:

Continuous cumulative plastic strain damage via the here-discussed (secondary) creep like fatigue damage process (climb+glide).

Microstructural recovery, leading to a partial relaxation of the residual stress field.

The residual stresses must (just like the load-induced and damage generating dynamic (cyclic) contact stress field) be described as a three-dimensional stress tensor that also varies over time, that is, it is also dynamic (evolving), but on a longer time-scale than the contact-induced stress field. It should also be clear that the residual stress field (tensor), in combination with the hoop stress field (tensor) resulting from interference fitting of inner and outer rings of bearings, or from centripetal forces induced by rotating components, and other superimposed structural stress components. All these various stress fields of different origins, including also the dynamic stress field from the actions of the rolling contact, contribute to the overall, highly dynamic, stress field tensor. From this stress tensor a deviatoric stress field and a normal stress field can be derived. Here the deviatoric stress field drives the fatigue damage process, while the normal stress field influences the rate by which the diffusion-controlled fatigue damage process precedes.

A foundation of the present invention is that the problem of fatigue and factors underlying fatigue are not classic plastic yielding (that is governed by dislocation glide), but a low temperature creep mechanism (that is governed by dislocation climb, itself being rate controlled by iron self-diffusion), rules the fatigue damage process. This latter mechanism is inherently (like all other kinetically controlled chemical and metallurgical processes) temperature dependent and time dependent.

Fatigue exposed components made of hardened and low-temperature tempered steels typically fail due to crack initiation from various defects. In respect to rolling contact fatigue, these defects are present either at the raceway surface (indentations from handling damage or mounting, denting from contaminated running or surface damage induced from improper lubrication, etc.) or within the material, that is, subsurface defects like non-metallic inclusions, pores, pre-existing crack, etc. Defects like these act as local stress raisers leading to a locally accelerated fatigue damage. The shear stress driven and thermally activated fatigue damage processes discussed in this document therefore occur at a higher rate in the steel matrix adjacent to the defects. This results in that the material, at some point in time, will fail locally at these highly stressed points, leading to crack initiation. From this point in time, the fatigue damage process will change to become one of crack propagation till failure (spalling).

Figure 1:
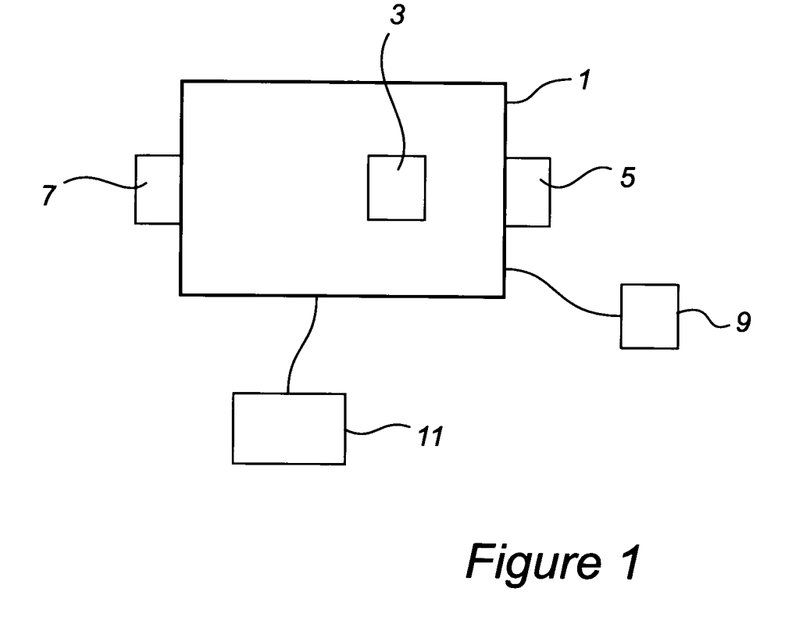
FIG. 1 shows a schematic illustration of a device suitable for executing the methods according to present invention.

In FIG. 1 a device 1 suitable for executing the methods according to present invention is given. It comprises a processor 3 for executing the methods, and input/output means 5, such as a mouse or a keyboard. In an embodiment, it comprises data communication capabilities 7 for receiving and transmitting metal object data. It may also comprise a screen 9 and/or a printer 11 for outputting results from the execution of the methods according to the present invention.

The fatigue test described here is run at high contact pressures, higher than those usually used in bearing applications. The rationale behind this is that the resulting subsurface plastic deformation, which can be observed as an evolving groove at the raceway surface, represents the damage that occur locally at stress raising defects like surface dents or subsurface defects, such as non-metallic inclusions, under typical application conditions.

The development of a surface groove during exposure to rolling contact fatigue is a result of plastic deformation processes in the subsurface material, where the Hertzian shear stresses are high. The groove formation is generally seen as a negative aspect in rolling contact fatigue testing, since it tends to alter the contact geometry and thereby the magnitude and shape of the contact pressure distribution over the raceway.

According to the present invention this generally seen "negative" aspect is turned into something positive in that we see the grooving response as a route to acquire quantitative information on the magnitude of the subsurface plastic deformation processes that govern the fatigue damage evolution. Having a detailed material model, it is possible to extract important information on the material characteristics by measuring and analysing the gradual groove development for a set of test conditions. This methodology according to the invention will be described in more detail.

The groove development is, as mentioned, a result of subsurface plastic deformation processes that occur in two sequential stages. Initially the microstructure, notably the crystal defect (dislocation and point defect) structure evolves towards a stationary condition, during the so-called "shakedown" stage. Thereafter a continuous "steady-state" damage process commences. These two processes are likely to have a similar metal physics origin, but they develop at different time-scales, where shakedown is understood as being the result of a "primary creep" like damage process that is completed within about $10^4$ to $10^5$ revolutions (or load cycles), followed by the steady-state fatigue damage, a result of a "steady-state" or secondary creep like process (the fatigue-induced micro-plasticity mechanism), which is active throughout the fatigue exposure. Although not strictly correct, shakedown is here treated as being time (and thereby cycle) independent (that is, immediate), while the steady-state fatigue response is modelled as being time dependent, using the materials-based description.

The grooving process is thus a sign of subsurface plastic deformation processes being active. A groove model must therefore contain functional dependences of the two sequential deformation stages. A general formulation of a grooving model may take the following form:

$$G = g(\gamma_{sd}, \gamma_N)$$

where $\gamma_{sd}$ is the plastic strain during shakedown and $\gamma_N$ is the steady-state cyclic creep strain or fatigue damage function, themselves being functions of the material properties and the operating variables. The function g aims at describing the relation between the cumulative subsurface plasticity processes and the resulting surface groove. This is a complex function that presently is not known in all its details and an approximate relationship therefore has to be used. For the purpose of our groove evaluation it is important to use a simple relation for g that contains a minimum of unknown "fitting constants" such that we can evaluate the material constants in the cyclic micro-plasticity model in an efficient way. For this purpose the actual functional relation used for g is of secondary importance, as long as it flexible enough to give a reasonably good description of the experimental information, while the use of the plastic fatigue damage function is of primary importance for the purpose of the evaluation. Therefore, simple relations are used to describe g and $\gamma_{sd}$ to capture these main effects, while a physically based description is used for the plastic fatigue damage function, $\gamma_N$, to capture its detailed dependencies.

The surface groove formation is the result of complex processes, where the micro-plastic behaviour is likely to play a central role, but where also other deformation mechanisms and the geometry changes of the contact, induced by the subsurface deformation, etc., also contribute. The grooving model described here describes two contributing parts: The shakedown effect that occurs early in the rolling contact fatigue exposure and which will here be assumed to be cycle independent (immediate); and: The cycle dependent, gradually evolving, grooving mechanism resulting from the subsurface micro-plasticity processes that are described here by the creep-like fatigue damage mechanism.

In terms of shakedown strain damage, the plastic strain, $\gamma_{SD}$, during the shakedown step is described using power-law relation (the Ludwik relation)

$$\gamma_{SD} = K \langle \tau - \tau_u \rangle^m$$

where K is a material constant, $\tau$ is the shear stress amplitude, $\tau_u$ is a threshold shear stress level that must be exceeded to induce plasticity and m is the shear stress exponent for the shakedown mechanism. The arrow bracket indicates that if the argument is negative the result is zero.

In terms of steady-state strain damage, the cyclic plastic damage, $\gamma_N$, is modelled as follows (under constant f, temperature and shear stress amplitude).

$$\gamma_N = A_N \langle \tau - \tau_u \rangle^c e^{(-(Q_0 - \Delta V \sigma)/RT)} N/f, \text{ where}$$

$A_N$ is a material constant, c is the shear stress exponent, $Q_0$ is the activation energy for the diffusion controlled micro-plastic strain mechanism in absence of internal stress, $\Delta V$ is a material constant, $\sigma$ is the hydrostatic stress state resulting from acting normal internal stresses, N is the number of load cycles (or revolutions), f is the loading frequency (or rotational speed), R is the universal gas constant and T is the local absolute operating temperature. Here, the quotient N/f equals the total running time (t) that is proportional to the "cumulative time under stress" during the rolling contact fatigue exposure.

The core of the model constitutes a "state variable", that is, a given value of such a variable corresponds to a given micro-plastic damage, independent on which combination of $\tau$, T, t (or N/f) and $\sigma$, used to reach the value of this state variable. The state variable may be written:

$$P_N = \langle p_0 - p_u \rangle^c e^{(-(Q_0 - \Delta V \sigma)/RT)} N/f,$$

where the shear stress parameters have been replaced by the maximum Hertzian contact pressure ($p_0$) and a threshold contact pressure ($p_u$), respectively.

Below, two examples of alternative grooving models are shown. The cumulative strain damage for the shakedown and the cycle dependent damage, $\gamma_{sd}$ and $\gamma_N$, respectively, are used as arguments in a power-law relation:

$$G = (a' \gamma_{sd} + b' \gamma_N)^{e'}$$

An alternative relation is given below, where the difference in character between the shakedown and steady-state strain damage processes is acknowledged by splitting the relation into a direct dependence of the cycle independent shakedown strain and a power-law relation describing the influence of the steady-state strain damage:

$$G = a'' \gamma_{sd} + b'' \gamma_N^{e''}$$

In these relations, the first term accounts for the cycle independent groove formation and the second term accounts for the time or load cycle dependent groove development (sometimes called "ratchetting"). The constants a', b' and e', and a'', b'' and e'', respectively, are regression constants and where the exponents account for the expected non-linearity between the groove depth and the plastic strain due to the groove geometry changes (changing contact geometry, etc.) and other less well defined influences.

The equations above give two different forms of the grooving model. Both these (and other relations) have been assessed in the development of the procedure for the evaluation of groove data. On fitting the experimental data to the selected grooving relation a somewhat modified form of the second equation is used from practical considerations:

$$G = a \cdot (p_0 - p_u)^m + b \cdot P_N^e$$

where also the shear stress parameters in the shakedown damage relation have been replaced by the maximum Hertzian contact pressure and a threshold contact pressure, respectively, and where the constants a, b and e are used as regression constants. The physically based material parameters ($p_u$, m, $Q_0$, $\Delta V$ and c), together with the regression constants, can be evaluated from the experimental information using multi-variable least-square regression analysis.

The grooving model allows also separating the initial (shakedown) damage, and the cyclic or fatigue induced damage. These parameters give additional valuable information on the behaviours of different material variants as basis for decisions on selecting material and processing routes for given applications.

Figure 2:
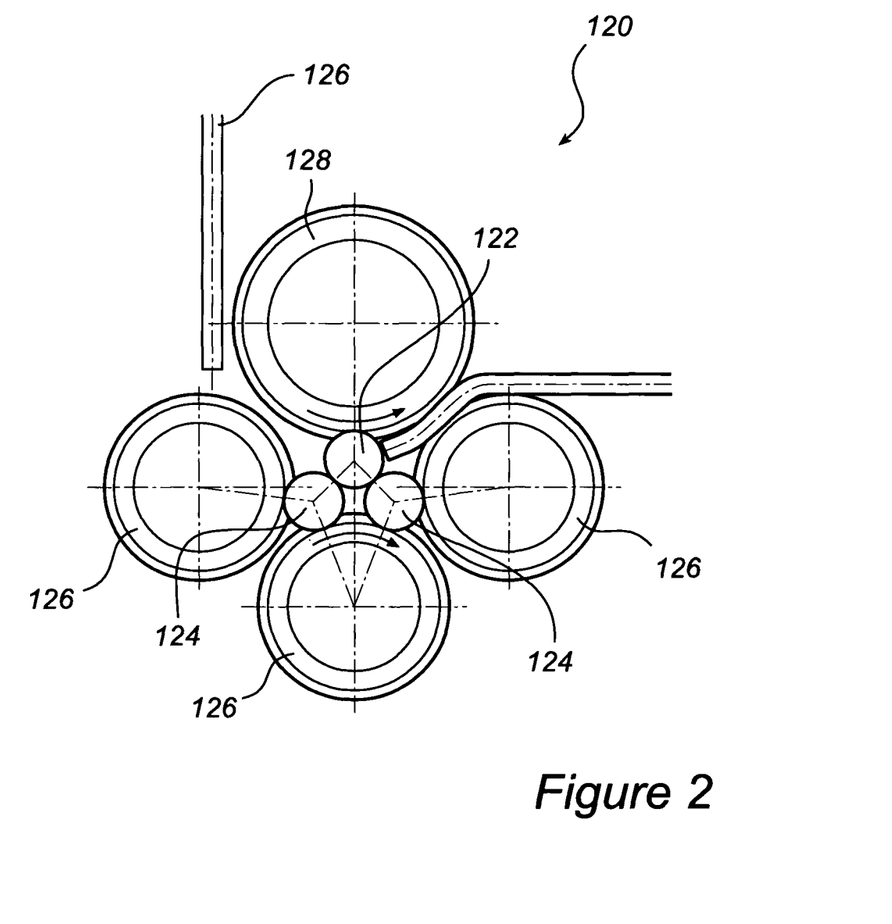
FIG. 2 shows a schematic illustration of a fatigue test rig.

A rig 120 usable when determining values of those constants is schematically shown in FIG. 2. The rig 120 allows running idealised rolling contact fatigue (RCF) tests where essentially only the steel matrix response to the RCF conditions are evaluated. In an embodiment, the specimen is a cylindrical roller 122 (diameter 18 mm and length 30 mm), which is exposed to near point contacts by two ceramic ($Si_3N_4$) balls 124 (diameter 19 mm), running along the same track on the roller circumference, giving two stress cycles per specimen revolution. Also, lubrication means 126 for lubricating the near point contacts is also provided. Three bearings 126 are provided to support the balls 124 and a non-driven wheel 128 supports the specimen 122.

This allows controlling closely the operating conditions, allowing varying contact pressure, varying temperature and varying rotational speed. Full film lubrication is maintained at all times. The fatigue response of the steel matrix can be evaluated using different techniques like metallography (optical and electron microscopy) and X-ray techniques, etc., methods that can be characterised as "indirect". In the method described here a more direct method of determining the cumulated plastic damage is applied, namely recording the groove formation at the raceway surface, resulting from the subsurface small-scale plastic damage during the RCF exposure.

A typical test programme for a material of interest consists of a test matrix involving a number of experiments usually run at constant speed and at varying contact pressure levels (at least two) and varying temperature (at least two levels). This allows evaluating the basic material parameters, or constants, including $p_u$, m, $Q_0$, and c. If also the material constant $\Delta V$ should be evaluated, additional experiments with varying internal stress levels such as (tensile) hoop stress (for example obtained by use of a compound roller with a shrink fitted shell on a roller core) or (usually compressive) residual stress (introduced during manufacturing of the specimen), have to be run (at least two internal stress levels have to be introduced). For each of the selected test conditions the evolving surface groove is evaluated using surface profiling techniques and a defined profile parameter (for example, groove shoulder to groove bottom or groove depth below the original surface) is defined to represent the groove depth. This parameter is measured either in-situ, using on-line interferometry, or intermittently for different exposure times, ranging from short (seconds or minutes) to long (hours or days).

Figure 3:
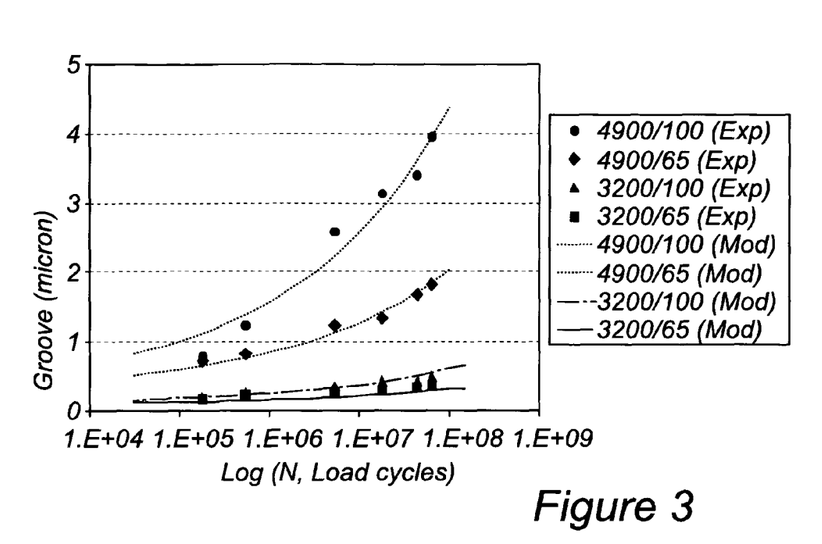
FIG. 3-5 shows diagrams indicating the relation between fatigue damage, in terms of surface groove depth, number of load cycles, and the absolute temperature of the hardened metal object.

In FIG. 3, a diagram indicating the relation between subsurface plastic fatigue damage observed in the form of a surface groove, plotted versus number of load cycles, and temperature, is given. This is an example of the correlation between the grooving model and experimental data from the testing of martensitically induction hardened, unalloyed, medium carbon bearing steel. The following set of material constants were found, as a result of the simultaneous multi-variable regression analysis of all data points (n=24):

m=2.5
$p_u$=580 MPa
c=16.3
$Q_0$=100 500 J/mol

In this case the $\Delta V$ value could not be evaluated since all tests were run without changing the internal stress parameter. The groove model fitting parameters took here the values: a=2.44·$10^{-10}$, b=1.48·$10^{-13}$ and e=0.254, with an overall correlation coefficient $r^2$=0.986. The diagram shows the grooving response after testing at two levels of contact pressure, 3.2 and 4.9 GPa, and at two temperatures, 65 and 100° C. Markers represent measured groove depths and the curves are the result of a simultaneous, multi-variable regression analysis of all data points shown (n=24, $r^2$=0.986). Also applicable to other figures, (Exp) denotes experimental data and (Mod) denotes data as originated from the grooving model.

Figure 4A:
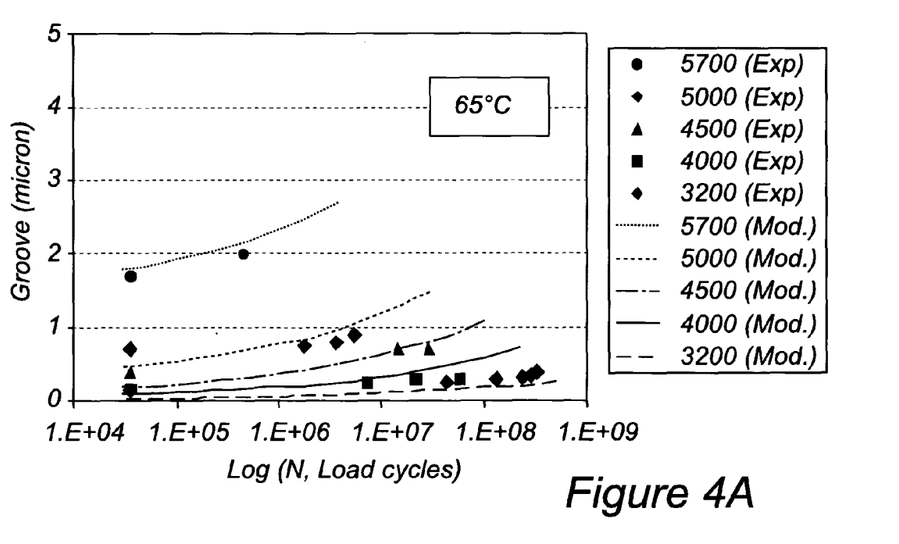
Figure 4B:
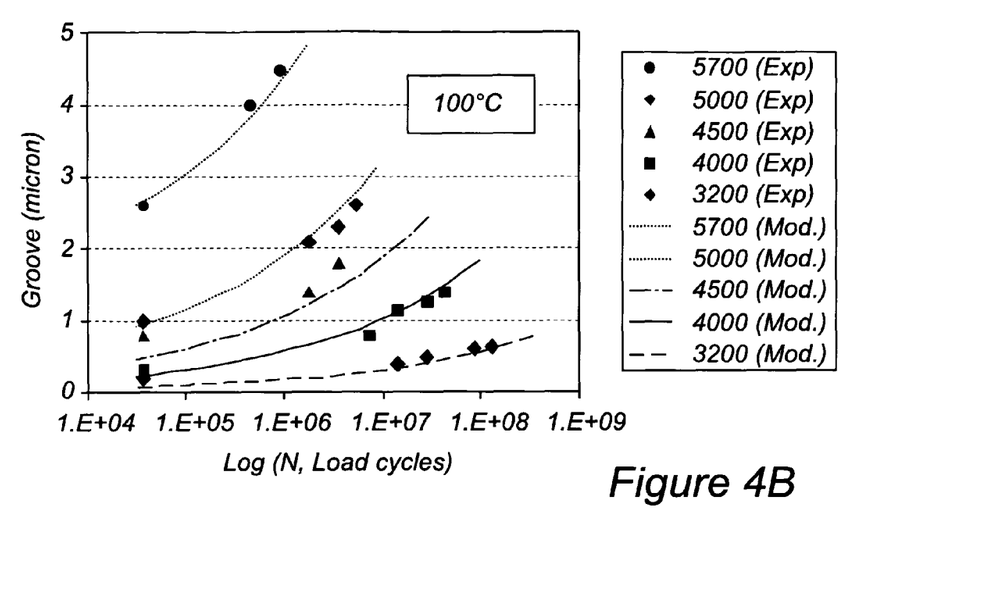

In FIGS. 4A and 4B, diagrams indicating the relation between subsurface plastic fatigue damage observed in the form of a surface groove, plotted versus number of load cycles, and temperature, are given. This is an example of the correlation between the grooving model and experimental data from the testing of martensitically through hardened, low-alloyed, high-carbon bearing steel. The following set of material constants were found as a result of the simultaneous multi-variable regression analysis of all data points (n=40):

m=10
$p_u$=1200 MPa
c=13.6
$Q_0$=135 000 J/mol

In this case the $\Delta V$ value could not be evaluated since all tests were run without changing the internal stress parameter. The groove model fitting parameters took here the values: a=4.13·$10^{-37}$, b=9.55·$10^{-10}$ and e=0.258, with an overall correlation coefficient $r^2$=0.979. The diagrams show the grooving response after testing at a range of contact pressures and at two temperatures, 65 and 100° C. Markers represent measured groove depths and the curves are the result of a simultaneous, multi-variable regression analysis of all data points shown (n=40, $r^2$=0.979).

Figure 5:
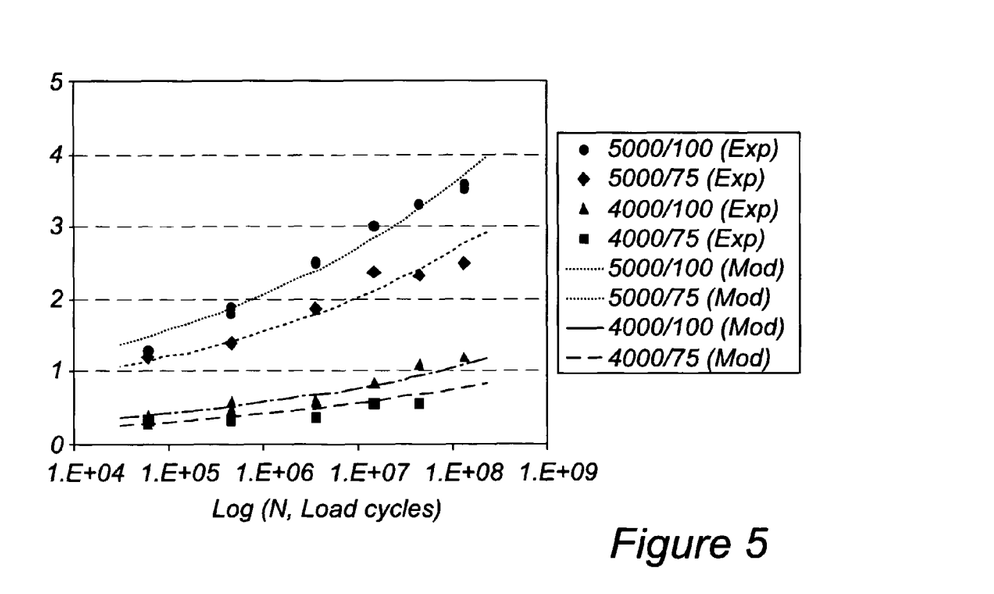

In FIG. 5, an example of the correlation between the grooving model and experimental grooving data of martensitically hardened, chromium and vanadium alloyed tool steel of bearing quality is shown. The following set of material constants were found for this secondary hardened tool steel, as a result of the simultaneous multi-variable regression analysis of all data points (n=35):

m=6
$p_u$=2500 MPa
c=17.2
$Q_0$=106 000 J/mol

In this case the ΔV value could not be evaluated since all tests were run without changing the internal stress parameter. The groove model fitting parameters took here the values: a=9.34·10$^{-22}$, b=4.16·10$^{-7}$ and e=0.132, with a correlation coefficient of r$^2$=0.988. The diagram shows the grooving response after testing at two levels of contact pressure, 4.0 and 5.0 GPa, and at two temperatures, 75 and 100° C. Markers represent measured groove depths and the curves are the result of a simultaneous, multi-variable regression analysis of all data points shown (n=35, r$^2$=0.988).

The invention claimed is:

1. A method of determining material constants of a hardened metal object being subjected to rolling contact fatigue, the method comprising the steps of:
   performing at least two fatigue tests with varying ambient and internal parameters such that each of the at least two fatigue tests is conducted with using at least one of a different constant temperature and a different constant pressure, each of the at least two fatigue tests applying continuous pressure to the hardened metal object throughout the duration of the test so as to form at least one groove in the hardened metal object resulting from contact between the hardened metal object's exposure to rolling contact fatigue, the continuous pressure being applied by at least one rolling element such that the number of stress cycles in a load cycle of the hardened metal object is equal to the number of the at least one rolling elements;
   determining a relative magnitude of subsurface plasticity processes governing damage evolution of the hardened metal object based on the at least one groove formed during the load cycles by rolling contact; and
   determining the material dependent constants of the hardened metal object based on determining the relative magnitude of the subsurface plasticity processes versus the load cycle for each of the at least two fatigue tests performed, the determining of the material dependent constants comprising analyzing the relative magnitude of subsurface plasticity processes versus the load cycle for the at least two fatigue tests.

2. The method according to claim 1, wherein the step of determining the relative magnitude of the subsurface plasticity processes includes quantitatively measuring dimensions of the at least one groove.

3. The method according to claim 2, wherein measuring the at least one groove includes measuring a groove depth.

4. The method according to claim 1, wherein the step of determining the relative magnitude of subsurface plasticity processes includes determining a plastic strain based on shakedown damage and a creep strain based on cyclic fatigue damage.

5. The method according to claim 1, wherein the step of applying load cycles to the hardened metal object includes using a rolling contact fatigue test rig to exert the load cycles on the hardened metal object;
   the rolling contact fatigue test rig comprising a test material exposed to circumferential contact by at least one ceramic ball, the at least one ceramic ball supported by at least two bearings, a non-driven wheel supporting the test material, and a lubrication means for lubricating the contact points of the test material and the at least one ceramic ball.

6. The method according to claim 1, wherein the step of applying load cycles to the hardened metal object includes using a point contact rolling contact fatigue test rig to exert the load cycles on the hardened metal object.

7. The method according to claim 1, wherein the step of applying varying internal parameters includes varying a contact pressure of the applied load cycles.

8. The method according to claim 1, wherein the step of applying varying ambient parameters includes varying a temperature of the hardened metal object during the applied load cycles.

9. The method according to claim 1, wherein the step of applying load cycles to the hardened metal object includes varying a load cycle frequency.

10. A method of indicating fatigue damage rate of a hardened metal object in relation to load cycles exerted on the hardened metal object by rolling contact fatigue, the method comprising the steps of:
    performing at least two fatigue tests with varying ambient and internal parameters such that each of the at least two fatigue tests is conducted with using at least one of a different constant temperature and a different constant pressure, each of the at least two fatigue tests applying continuous pressure to the hardened metal object throughout the duration of the test so as to form at least one groove in the hardened metal object resulting from contact between the hardened metal object's exposure to rolling contact fatigue, the continuous pressure being applied by at least one rolling element such that the number of stress cycles in a load cycle of the hardened metal object is equal to the number of rolling elements;
    determining a relative magnitude of subsurface plasticity processes governing damage evolution of the hardened metal object based on the at least one groove formed during the load cycles by rolling contact;
    determining the material dependent constants of the hardened metal object based on determining the relative magnitude of the subsurface plasticity processes versus the load cycle for each of the at least two fatigue tests performed and analyzing the relative magnitude of subsurface plasticity processes versus the load cycle of the at least two fatigue tests; and
    determining the fatigue damage rate of the hardened metal object based on the determined material dependent constants.

11. The method of indicating fatigue damage rate according to claim 10, wherein the step of determining the fatigue damage rate of the hardened metal object includes calculating the fatigue damage rate based on an effective activation energy parameter for the dislocation climb process, Q, shear stress amplitude, τ, the absolute local temperature of the hardened metal object, T, and load frequency, f.

12. The method according to claim 11, wherein the step of calculating the fatigue damage rate includes calculating the load cycle based fatigue damage rate according to:

$$d\gamma/dN = A <\tau-\tau_u>^c e^{(-kQ/RT)}/f, \text{ where}$$

A is $A_0(H_{Vref}/H_V)^d$, where $A_0$ is a constant larger than zero but smaller than 10$^{-8}$, $H_{Vref}$ is the Vickers hardness for a reference metal, $H_V$ is the Vickers hardness for the hardened metal object;

$<\tau-\tau_u>$ is zero for $\tau \leq \tau_u$ and $\tau-\tau_u$ for $\tau>\tau_u$, where $\tau_u$ is the fatigue limit for the hardened metal object;

c is a constant in the interval 6 to 22;

d is a constant in the interval 6 to 22;

k is a constant between 0.50 and 1.50;

T is the absolute temperature of the hardened metal object at the point of contact; and R is the universal gas constant.

13. The method according to claim 11, wherein the step of calculating the fatigue damage rate includes calculating the time based fatigue damage rate according to:

$$\gamma/dt = A <\tau-\tau_u>^c e^{(-kQ/RT)}, \text{ where}$$

A is $A_0(H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object;

$<\tau-\tau_u>$ is zero for $\tau \leq \tau_u$ and $\tau-\tau_u$ for $\tau > \tau_u$, where $\tau_u$ is the fatigue limit for the hardened metal object;

c is a constant in the interval 6 to 22;

d is a constant in the interval 6 to 22;

k is a constant between 0.50 and 1.50;

T is the absolute temperature of the hardened metal object at the point of contact, and R is the universal gas constant.

14. The method according to claim 11, wherein the temperature, T, is lesser than $0.4T_m$, where $T_m$ is the absolute melting temperature of the hardened metal object.

15. A method of indicating fatigue damage rate of a hardened metal object in relation to load cycles exerted on the hardened metal object by rolling contact fatigue, the method comprising the steps of:

performing at least two fatigue tests with varying ambient and internal parameters such that each of the at least two fatigue tests is conducted with using at least one of a different constant temperature and a different constant pressure, each test applying continuous pressure to the hardened metal object throughout the duration of the test so as to form at least one groove in the hardened metal object resulting from contact between the hardened metal object's exposure to rolling contact fatigue, the continuous pressure being applied by at least one rolling element such that the number of stress cycles in a load cycle of the hardened metal object is equal to the number of rolling elements;

determining a relative magnitude of subsurface plasticity processes governing damage evolution of the hardened metal object based on the at least one groove formed during the load cycles by rolling contact;

determining the material dependent constants of the hardened metal object based on determining the relative magnitude of the subsurface plasticity processes versus the load cycle for each of the at least two fatigue tests performed and analyzing the relative magnitude of subsurface plasticity processes versus the load cycle of the at least two fatigue tests; and determining the fatigue damage rate of the hardened metal object based on the determined material dependent constants including calculating the fatigue damage rate based on an effective activation energy parameter for the dislocation climb process, Q, shear stress amplitude, $\tau$, the absolute local temperature of the hardened metal object, T, and load frequency, f, wherein the step of calculating the fatigue damage rate includes calculating the load cycle based fatigue damage rate according to:

$$d\gamma/dN = A <\tau-\tau_u>^c e^{(-kQ/RT)}/f, \text{ where}$$

A is $A_0(H_{Vref}/H_V)^d$, where $A_0$ is a constant larger than zero but smaller than $10^{-8}$, $H_{Vref}$ is the Vickers hardness for a reference metal, $H_V$ is the Vickers hardness for the hardened metal object;

$<\tau-\tau_u>$ is zero for $\tau \leq \tau_u$ and $\tau-\tau_u$ for $\tau > \tau_u$, where $\tau_u$ is the fatigue limit for the hardened metal object;

c is a constant in the interval 6 to 22;

d is a constant in the interval 6 to 22;

k is a constant between 0.50 and 1.50;

T is the absolute temperature of the hardened metal object at the point of contact; and R is the universal gas constant.

\* \* \* \* \*